United States Patent
Meissner

[11] 3,771,654
[45] Nov. 13, 1973

[54] CENTRIFUGAL SEPARATOR

[75] Inventor: Heribert Meissner, Cologne-Bayenthal, Germany

[73] Assignee: Josef Meissner, Cologne-Bayenthal, Germany

[22] Filed: Apr. 9, 1971

[21] Appl. No.: 132,709

Related U.S. Application Data

[63] Continuation-in-part of Ser. No. 23,285, March 27, 1970, abandoned.

[30] Foreign Application Priority Data

Mar. 27, 1969 Germany.................. P 19 15 744.9

[52] U.S. Cl.................. 210/84, 210/294, 210/322, 210/512
[51] Int. Cl............................................. B01d 21/26
[58] Field of Search.................... 210/83, 84, 208, 210/279, 179, 256, 294, 327, 513, 520, 523, 512; 204/211 X; 55/401, 408, 409

[56] References Cited
UNITED STATES PATENTS

| | | | |
|---|---|---|---|
| 2,399,140 | 4/1946 | Peters et al...................... | 210/84 X |
| 2,538,870 | 1/1951 | Hunter........................... | 209/211 X |
| 2,791,158 | 5/1957 | Pollers........................... | 55/408 X |
| 2,413,375 | 12/1946 | Pomeron......................... | 210/83 X |
| 3,233,742 | 2/1966 | Shaines et al.................... | 210/83 X |
| 2,510,781 | 6/1950 | Howard.......................... | 209/211 X |
| 3,224,173 | 12/1965 | Webb............................. | 55/408 |
| 3,396,850 | 8/1968 | Kubat et al. ...................... | 210/513 |

Primary Examiner—John Adee
Attorney—Spencer & Kaye

[57] ABSTRACT

Immiscible liquids of different specific gravities are separated in a hollow rotating shaft of a vessel. The hollow shaft and related structure to receive the separated liquids include a separating surface in the form of a plate disposed in the upper end of the hollow shaft. The media separated in the hollow shaft are thrown off through spill-over pipes into collecting cups.

6 Claims, 2 Drawing Figures

CENTRIFUGAL SEPARATOR

CROSS-REFERENCE TO RELATED APPLICATION

This is a continuation-in-part of copending application Ser. No. 23,285, filed Mar. 27th, 1970 and now abandoned.

BACKGROUND OF THE INVENTION

Immiscible liquids which differ in density are separated with the aid of static or mechanical separators. These separators are individual devices which are placed next to containers from which a mixture of two or more such liquids to be separated comes. When the immiscible liquids comprise a reactable medium, such as that produced during the nitration of hydrocarbons, a static separator requires long dwell times and has a further drawback in that reaction occurs in the separating zone. A mechanical separator presents difficulties with highly viscous liquids because of its poor heatability and its external location. The same applies for the separation of, e.g., molten products and accompanying liquid substances.

In the countercurrent nitration of dinitrotoluol to trinitrotoluol, the emulsion flowing out of the nitration apparatus is separated in a centrifuge. The centrifuge is fastened to the same shaft as the stirring mechanism, and the influx of the emulsified reaction mixture from the nitration apparatus into the centrifuge goes from the bottom of the nitration apparatus through the hollow shaft of the stirrer. Although the centrifuge produces good and rapid separation, the installation of a centrifuge on the stirring shaft in the interior of the reactor requires a substantial technical effort and the capacity of the reactor is reduced notwithstanding the fact that the centrifuge is substantially smaller than the reactor.

SUMMARY OF THE INVENTION

An object of this invention is to separate mixtures of two or more immiscible liquids into their component liquids.

A further object is to separate into its components an emulsion of two liquids which differ from each other in specific gravity.

Another object is to separate aqueous and nonaqueous phases of a liquid admixture.

A still further object is to provide apparatus for accomplishing the preceding objects. Additional objects will become apparent from the following description.

These objects and others are accomplished according to the present invention wherein an admixture of two immiscible liquids of different specific gravities is separated into its component liquids by passing it up into a hollow rotating shaft. A separating plate at the upper portion and inside of the hollow shaft blocks the passage of lower density liquid and permits the passage of higher density liquid, the liquids of lower and higher densities being drawn off, respectively, through spill-over pipes provided therefore. Each spill-over pipe for lower density liquid extends further into the center of the shaft than does its counterpart for higher density liquid.

DESCRIPTION OF THE PREFERRED EMBODIMENTS

Figure 1:
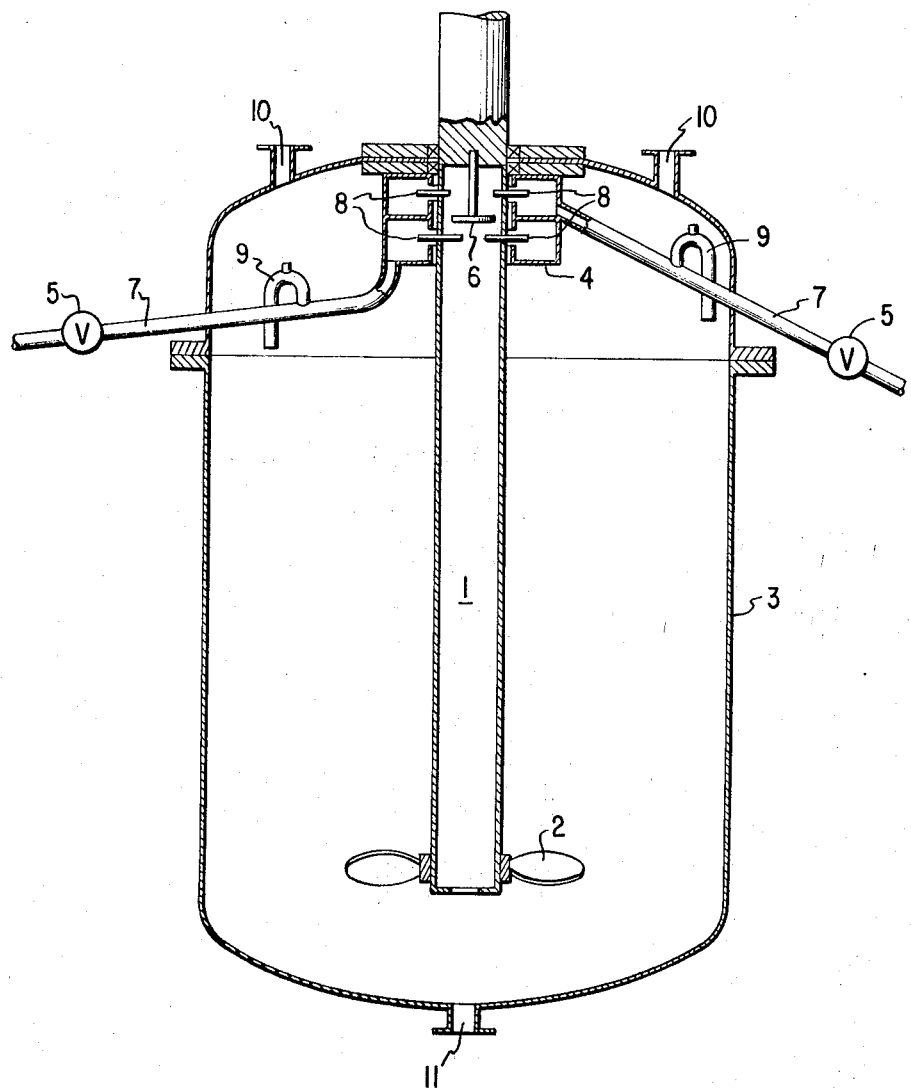
FIG. 1 is a plan view of a vessel in which the separator according to the subject invention is installed.

Apparatus for separating immiscible liquids which differ in density is shown in FIG. 1. A cylindrical, conical or downwardly narrowing unilaterally mounted hollow shaft (1) provided with stirring vanes (2) is disposed in a container (3). A separating surface in the form of a metal plate (6) is disposed in the upper end of the hollow shaft (1). The media separated in the hollow shaft are thrown off through spill-over pipes (8) into collecting cups (4) and the separated media leave the collecting cups (4) through lines (6) provided with control valves (5) and spill-over tubes (9).

The method and apparatus are particularly useful in the separation of explosive liquid mixtures since there are no friction-producing or rolling components in the device. The apparatus is well suited for counterflow nitration processes since it facilitates the separation of mixtures developing in a nitration reaction without special apparatus requirements in each nitration reactor of a nitration cascade.

The hollow shaft meets two concurrent requirements; it effects a rapid and simple separation of the media and also provides agitation. Separate heating is not required since the entire separator [in the form of hollow shaft (1)] is disposed in heatable container (3). By altering the discharge openings with respect to the axis of rotation, any desired immiscible liquid media which have different specific weights can be separated. Regulation of the amount of flow is easily accomplished during operation by changing the discharge opening cross section of spill-over pipes (8). The container may be, for example, a flow-through container in which two liquid media are separated or a washer or a reaction vessel, e.g. nitration apparatus.

Figure 2:
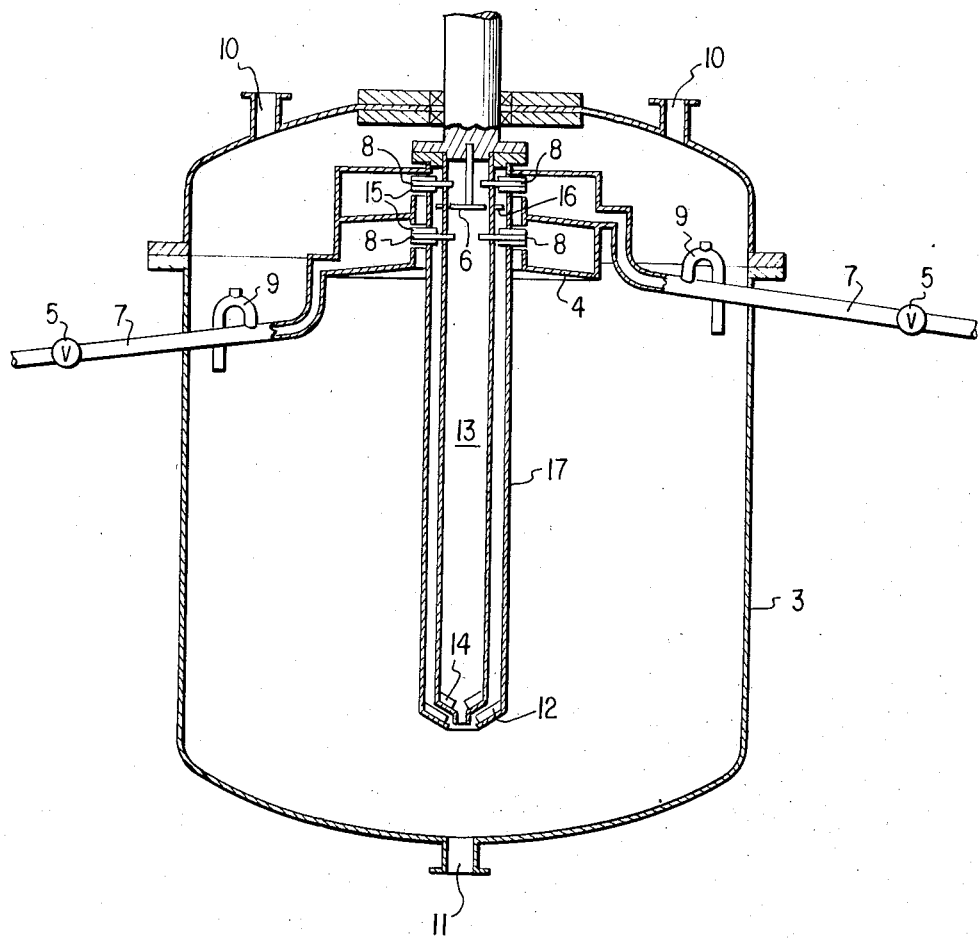
FIG. 2 is a plan view of a vessel similar to that of FIG. 1, but having a centrifuge which is a double hollow shaft.

According to a special embodiment of the apparatus, as shown in FIG. 2, a double hollow stirring shaft is provided with outer tube (17) and coaxial inner tube (13). Tubes (13) and (17) rotate together at the same rate. These tubes have vanes (12) and (14), respectively, to assist in drawing the liquid into the shaft during rotation. To accommodate the outer tube and to assist in the available separation, spill-over pipes (15) and metal plate (16) are employed in the same manner as their counterparts (8) and (6), respectively. Other elements in FIG. 2 are the same as in FIG. 1. Tube (17) can be provided with a stirring vane (2) in the same manner as indicated for shaft (1) in FIG. 1. The cross sections of shafts (1), (13) and (17) are circular.

The structure of FIG. 2 increases the separating effect — particularly at lower speeds of the hollow stirring shaft. In those cases where a single hollow stirring shaft, as shown in FIG. 1, is inadequate to separate an emulsion completely into its components, the stirring shaft can be lengthened or further hollow tubes (illustrated in FIG. 2) can be added. For any particular rotation rate which is at least adequate to effect some separation by the shaft with the smallest diameter, a hollow shaft composed of plural concentric hollow tubes will process the same amount of emulsion as a single hollow shaft rotating at a higher rate. Moreover, a hollow shaft composed of plural concentric hollow tubes is more effective in producing a complete separation than its single hollow shaft counterpart. Embodiments with more than one coaxial hollow shaft provide a more compact construction, a higher rate of processing, a lower effective operating speed in terms of revolutions per minute and a better separating effect.

The apparatus is useful in the form of a nitration reactor wherein it is employed to separate the nitroaromatics of the nitration acid (mixing acid) or to separate nitroaromatics from water, e.g. for the separation of nitrobenzene from water, in which case the vessel is provided with inlet (10) and outlet (11) pipes.

The hollow shaft is, alternatively, mounted in both the top and the bottom of the container or reaction vessel. In such case the bottom mounting may be similar to the top mounting shown in FIG. 1 or any known journal structure. Outlet (11) is offset in the bottom of the container, and the inlet to the hollow shaft is peripheral, rather than axial. To assist the intake of the hollow shaft when the charge is through peripheral openings therein, these openings are, e.g., provided with scoops or vanes immediately downstream thereof to direct the liquid admixture into the hollow shaft.

In order to effect separation, vessel (3) must contain a level of emulsion which is substantially above the lower extremity of the hollow shaft. At the start of any separation the vessel is ordinarily at least half full. Preferably, from 50 to 60 percent of the hollow portion of the shaft is immersed in the emulsion being separated. There is a definite relationship between the minimum level of emulsion, the diameter of the hollow shaft and the speed at which the shaft is driven. The speed must be sufficient to drive the heavier emulsion component at least to the upper spill-over pipes (8) and (15). The speed (revolutions per minute) of the hollow shaft depends on the liquids being separated and the inner diameter of the shaft.

To obtain efficient operation of the separation effect, the rotational speed of hollow shaft (1) must be sufficient to cause the heavier component of the liquid admixture to go to the internal periphery thereof and thus force the lighter component towards the center thereof. It is the restriction of the lighter component to the central axial portion of the hollow shaft which permits separating plate (6) to restrain passage of such lighter component while permitting the passage of the peripherally-oriented heavier component. The spill-over pipes (8) below separating plate (6) extend to the central portion of the hollow shaft so that they can serve to draw off the lighter component, whereas the spill-over pipes (8) above separating plate (6) just barely extend into the hollow shaft so that they may provide passage for the heavier component.

The distance the lower spill-over pipes extend into the hollow shaft depends on the relative volumetric proportion of less dense liquid component to the more dense liquid component. The relative diameters of the several spill-over pipes are dependent upon the viscosity of the respective liquids and the relative amounts of the liquids. It is preferred to remove the liquids in the same proportions as they exist in the admixture which is being separated.

The container (3) can be any vessel suitable for the central mounting of hollow shaft (1). It need not be closed at the top, but it can be closed; it may be a reaction vessel, such as an autoclave, in which the temperature and pressure are regulatable. The capacity of the container is unlimited and has no bearing on the practice of the invention; it could range, e.g., from a liter flask to a 5,000 gallon, or larger, autoclave. The diameter of the hollow shaft is dependent upon the general size of equipment being employed and the separation capacity required. It can be varied from 1 inch or less to several feet. The length of the hollow shaft is entirely dependent upon size of the container and the nature of required agitation, i.e. if stirring vanes (2) are provided for this purpose. The shaft length is ordinarily at least four, or even eight, times the internal diameter thereof and preferably at least 10 or 12 times the internal diameter.

The difference in densities of the liquids which form the admixture to be separated should be at least three percent; the greater the difference, the easier the separation. The ratio (by volume) of the heavier (more dense) liquid component to the lighter (less dense) liquid component may vary over a large range, e.g. from 50:1 to 1:50; ordinarily the range is from 20:1 to 1:20 or even from 10:1 to 1:10. The preferred range is from 5:1 to 1:5 and, ideally, from 3:2 to 2:3. The admixture can be of any type as long as the several liquids are immiscible; it can be, e.g., a simple admixture, a relatively unstable dispersion or an emulsion.

From the preceding description and the drawings one skilled in the art can practice the subject invention. The following illustrative embodiments are provided to demonstrate further how the invention operates. These embodiments are entirely exemplary in nature.

| | |
|---|---|
| Emulsion: Nitrobenzene/Water | 50% by weight of nitrobenzene |
| Specific gravity of nitrobenzene: | 1.2 |
| Viscosity of emulsion: | 1.5 cp |
| Surface tension of nitrobenzene | 42.7 erg/cm$^2$ |
| Ratio of reactor-diameter to centrifuge-diameter | 6:1 |
| Level in the reactor: | 50% of centrifuge-length |
| Distance of the centrifuge from the bottom of the reactor: | one diameter of the rotating shaft |

| Ex. No. | Inner diameter of the rotating shaft | Length (centimeters) | Critical revolution speed (minimum rpm) |
|---|---|---|---|
| 1. | 4 | 30 | 1400 |
| 2. | 7 | 100 | 1530 |
| 3. | 10 | 100 | 765 |

Below the critical revolution speed the centrifuge does not process (feed) any emulsion.

Operating the same equipment at the same reactor level for the same emulsion, the relationship between the amount of emulsion processed and the shaft speed is illustrated by the following examples:

| Ex. No. | Inner diameter (cm) | Length (cm) | Shaft speed (rpm) | Through-flow volume (liters per hour) |
|---|---|---|---|---|
| 4. | 4 | 30 | 2100 | 15 |
| 5. | 4 | 30 | 2300 | 47 |
| 6. | 4 | 30 | 2600 | 100 |
| 7. | 10 | 100 | 930 | 720 |
| 8. | 10 | 100 | 1220 | 1200 |
| 9. | 10 | 100 | 1470 | 1800 |

The through-flow volume is the sum of the liquids taken off in separated form from the spill-over pipes of the separating device. Furthermore, the quality of the separation is dependent on the adjustment of the ventiles of the spill-over pipes. The adjustment-values in the following examples are relative, because these values depend on the construction of the centrifuge:

| Ex. | Relative adjustment of the ventiles (millimeters) | through-flow volume (liters | Quality of the separated liquid |
|---|---|---|---|

| | ventiles nitrobenzene | ventiles water | per hour) | Nitrobenzene | water |
|---|---|---|---|---|---|
| | | | | | % nitrob. |
| 10. | 129/130 | 130–131 | 960 | free of water | 3.0 |
| 11. | 129.25 | 130–131 | 960 | free of water | 0.59 |
| 12. | 129.75 | 130–131 | 960 | free of water | 0.43 |
| 13. | 130 | 130–131 | 960 | traces of water | 0.45 |

Although the disclosed process and equipment are illustrated in the separation of a particular emulsion, they are readily applicable for an entire range of emulsions, as is readily apparent to the art skilled. There is no requirement that the emulsion be an aqueous emulsion but, in practice, water ordinarily comprises either the continuous or the discontinuous phase of a two-phase emulsion processed according to the instant invention. Illustrative emulsions separated in this manner include:

nitrobenzene/water, nitrotoluenes/water, nitroethylbenzene/water, glycerinetrinitrate/water, glycol- and diglycoldinitrate/water. The component "water" may be washing water or nitration acid mixtures arising in a counterflow nitration process.

It will be understood that the above description of the present invention is susceptible to various modifications, changes and adaptations, and the same are intended to be comprehended within the meaning and range of the equivalents of the appended claims.

I claim:

1. A process of separating an admixture of two immiscible liquids having different specific gravities into the component liquids, one of which has a lower specific gravity and the other of which has a higher specific gravity, which comprises (a) rotating a hollow shaft at a speed sufficient to cause a charge of the admixture contained therein to separate, the component liquid having the higher specific gravity forming a peripheral layer and forcing the component having a lower specific gravity to pass along an axial path, (b) passing the admixture through the hollow shaft while the latter is so rotating, (c) drawing off the component having a lower specific gravity from the axial path, (d) blocking the axial path of the component having a lower specific gravity downstream of step (c), permitting virtually only the component having a higher specific gravity to pass, and (e) drawing off the component having a higher specific gravity from the peripheral layer downstream of step (d).

2. A process according to claim 1 wherein the admixture is an emulsion and is introduced axially into the hollow shaft.

3. A process according to claim 2 wherein the two immiscible liquids are water and nitrobenzene.

4. A centrifugal separator for separating into component liquids an admixture of two liquids of different densities nd comprising a plurality of concentric cylindrical tubes of circular cross section, each said tube having a solid peripheral wall, an axial inlet at one end thereof and first means, near the other end thereof, including at least one spill-over pipe which is unitary with, is essentially perpendicular to, and extends through, said solid peripheral wall, for withdrawing the lighter of the two component liquids, means for blocking the flow of said lighter of the two component liquids, and second means including at least one spill-over pipe which is unitary with, is essentially perpendicular to, and extends through, said solid peripheral wall to a position adjacent the internal periphery of its corresponding cylindrical tube, for withdrawing the heavier of the two component liquids, said second means being downstream of said first means and the blocking means being therebetween, and said first means extending nearer the axes of said tubes than do said second means, each spill-over pipe being provided with a receptacle for collecting the liquid component withdrawn therethrough, the receptacle for each lighter component spill-over pipe being separate and distinct from that for each heavier component spill-over pipe.

5. A centrifugal separator for separating into component liquids an admixture of two liquids of different densities and comprising a rotatable hollow shaft having a circular cross section and a solid peripheral wall, said shaft having an inlet at one end thereof and a plurality of discharge nozzles, near the other end thereof, said discharge nozzles being disposed along the direction of flow of liquid through said shaft and extending into the interior of said hollow shaft, said nozzles including at least one nozzle positioned to withdraw the lighter of the two component liquids and at least one second nozzle positioned to withdraw the heavier of the two component liquids, said second nozzle being downstream from said first nozzle, an abutment plate positioned in the direction of flow and between said first and second nozzles, said plate defining an annular gap with said peripheral wall, said nozzles and plate rotating with said shaft, a first receptacle positioned outside of said shaft for collecting the liquid component withdrawn by said first nozzle and a second receptacle positioned outside of said shaft for collecting the liquid component withdrawn by said second nozzle.

6. A centrifugal separator according to claim 5, further comprising vanes mounted within said shaft and near said inlet end thereof for rotating the entering liquid.

* * * * *